United States Patent [19]

McGill et al.

[11] 4,147,265
[45] Apr. 3, 1979

[54] ADJUSTABLE APPARATUS FOR CASE LOADING AND UNLOADING

[75] Inventors: Robert W. McGill, Munroe Falls; Michael E. Winiasz, Lorain, both of Ohio

[73] Assignee: A-T-O, Inc., Willoughby, Ohio

[21] Appl. No.: 879,130

[22] Filed: Feb. 21, 1978

[51] Int. Cl.$^2$ .............................................. B65G 65/38
[52] U.S. Cl. .................................... 414/416; 198/479; 414/753
[58] Field of Search .............. 214/1 BA, 309; 198/479, 198/812; 294/65

[56] References Cited

U.S. PATENT DOCUMENTS

| | | | |
|---|---|---|---|
| 3,272,360 | 9/1966 | van der Schoot | 214/309 |
| 3,289,867 | 12/1966 | Burke | 214/309 |
| 3,542,412 | 11/1970 | Koch et al. | 198/479 X |
| 3,610,673 | 10/1971 | Strombeck et al. | 294/65 |
| 3,951,285 | 4/1976 | Barker | 214/309 |

*Primary Examiner*—L. J. Paperner
*Attorney, Agent, or Firm*—Oldham, Oldham, Hudak & Weber Co.

[57] ABSTRACT

Apparatus for article deposit and/or removal from carrier cases and comprising a pair of endless carrier conveyors operatively positioned on an upper portion of a frame in adjacent parallel relationship for movement through a fixed course extending longitudinally of the frame; a plurality of positioning members or carrier bars for article grippers are operatively connected to the carrier conveyors for movement therewith, which positioning members extend transversely of the frame and have the article grippers depending therefrom; and a pantograph that extends longitudinally of the frame is present for each set of carrier bars corresponding to the array of articles in the cases to be processed, the pantograph has a leading and a trailing end with different ends being secured to different ones of the conveyors for movement therewith. Unitary drives are provided for the conveyors and a control connects the drives to the conveyors to drive the same and permit control of the relationship of one conveyor to the other for changing the effective longitudinal length of the pantograph and the spacing of the positioning members longitudinally of the apparatus for adjustment to cases of different sizes and to different article arrays or groupings.

16 Claims, 10 Drawing Figures

ADJUSTABLE APPARATUS FOR CASE LOADING AND UNLOADING

BACKGROUND OF INVENTION

In the bottle processing industries, such as the carbonated beverage industry, it is very desirable and necessary to process large quantities of bottles rapidly. The bottles are transported in cases of various types and sizes and one of the operations that must be performed on all bottles in the processing plants are those of removing empty bottles from the carrier cases and ultimately loading filled bottles into cases. Various types of bottle uncasing and casing apparatus have been provided heretofore.

In these bottle processing plants, naturally it is desirable that the apparatus occupy a relatively small volume of space and it is preferable that the apparatus be easily adjustable so that it can be used with cases of different sizes and number of contents. The size of the cases may vary widely as to the number of bottles carried therein and the bottle positioning arrangements or locations in the cases vary appreciably from case to case.

One prior U.S. Pat. No. 3,951,285, deals with bottle uncasing apparatus that is designed to be of an automatic type for engaging bottles in a case no matter what the longitudinal spacing of the bottles is in the apparatus. Such apparatus includes the provision of a plurality of rows of longitudinally closely adjacent, self operating grippers that are carried along an endless path above a moving case for automatically engaging with the necks of bottles in the cases for engaging the same and lifting them out of the case regardless of longitudinal spacing of the bottles in the case. Such apparatus involves the provision of a great number of article grippers in the apparatus and there is no positive positioning of the grippers for bottle engagement in relation to the actual location of the bottles in the carrier cases.

OBJECTS OF THE INVENTION

The general object of the present invention is to provide an article processing apparatus for loading articles into cases and/or for unloading articles, usually bottles, from cases and wherein the article engaging members in the apparatus are positioned for adjustment both transversely and longitudinally of the apparatus for accommodation with a variety of quantities and spacing of articles in a carrier case.

Another object of the invention is to utilize a pantograph device connected between two adjacent, parallel course conveyors for positioning article gripper devices in the apparatus in controllable positions by variation in the size and operative shape of the pantograph device.

Another object of the invention is to provide a unitary drive means between article engaging members positioned on an upper portion of a frame and a case moving device operatively positioned on a lower portion of the frame and wherein adjustments can be made in this drive means for varying the position of the article engaging means, as units, in relation to the case carrier means on another portion of the frame.

Another object of the invention is to provide a flexible pantograph means that can be moved around a closed or endless orbital path and wherein the pantograph means is made from individual control arms each of which comprises a plurality of superimposed flexible metal plates or straps of uniform size and which arms are operatively pivotally connected for forming the pantograph device that is flexible longitudinally and transversely without interfering with the operability thereof.

Other objects of the invention are to provide a positive size and spacing control for positioning article gripper means in case loading and unloading apparatus to provide convenient adjustability to adapt to the size of carrier cases to be processed; to provide means to adjust the longitudinal spacing of transversely extending carrier bars in their connections to endless conveyor drive members provided in the apparatus; to provide improved means for adjusting the relative longitudinal positions of two parallel endless drive conveyors provided on one lateral portion of the apparatus and which control the positions of the article gripper carrier bars in the apparatus; and in general to provide an improved mechanical apparatus having good service life with a minimum of maintenance for adjustably positioning article engaging members in a bottle processing apparatus.

Reference now is made to the accompanying drawings, wherein.

When referring to corresponding members shown in the drawings and referred to in the specification, corresponding numerals are used to facilitate comparison therebetween.

INVENTIVE SUBJECT MATTER

Figure 1:
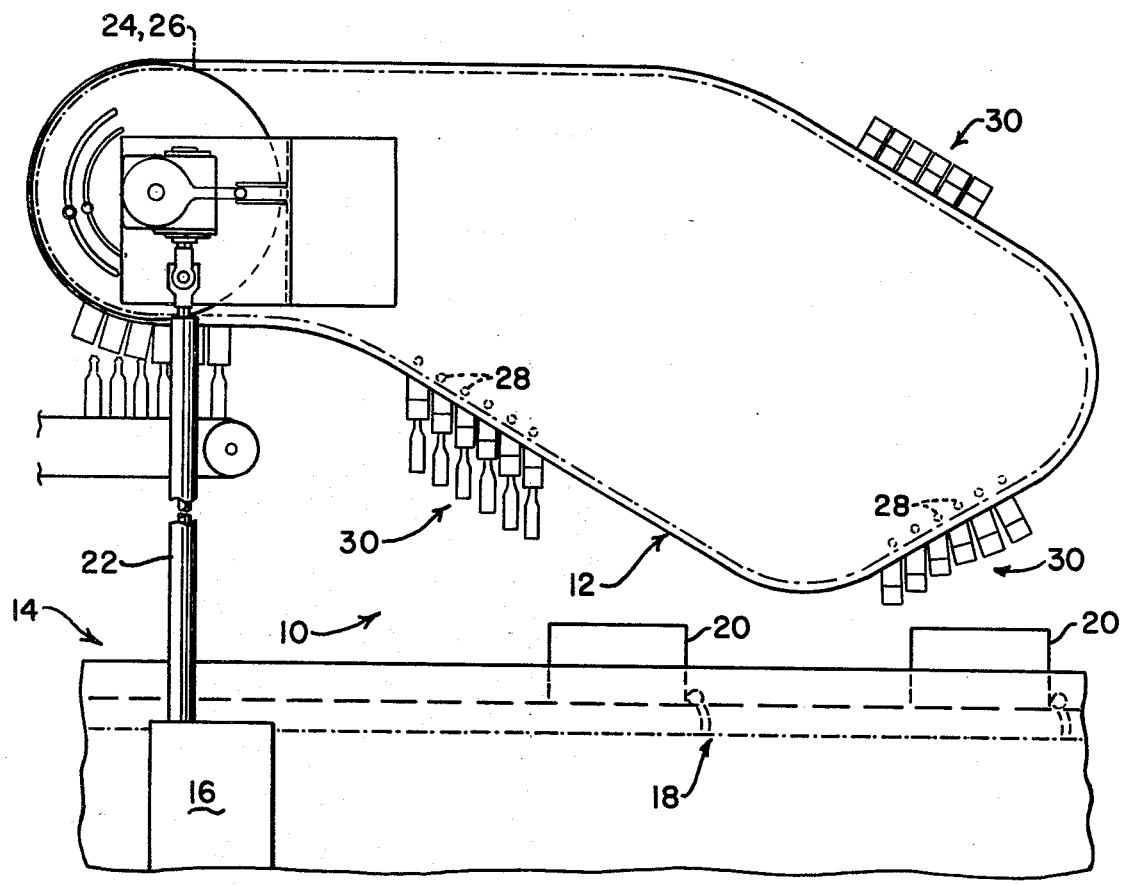
FIG. 1 is a partially diagrammatic elevation of a bottle processing apparatus embodying the principles of the invention.

The present invention, as one embodiment thereof, relates to apparatus for article deposit in and/or removal from carrier cases and where the apparatus comprises a mounting frame including upper and lower portions, a pair of endless carrier conveyors operatively positioned on the frame upper portion in adjacent and parallel relationship to each other for unitary movement through a fixed course extending longitudinally of the frame, a plurality of positioning members for article gripper means extending transversely of the frame and operatively connected to the carrier conveyors for movement therewith, a pantograph means extending longitudinally of the frame and having a leading end and a trailing end with the different ends being secured to different ones of said carrier conveyors, the pantograph means operatively connecting the positioning members to the carrier conveyors for longitudinal adjustment of the positions of the positioning members in relation to the endless carrier conveyors; drive means connecting to the conveyors for unitary drive of the same, control means forming a part of the drive means for connecting the same to the conveyors to control the relationship of one conveyor to the other for change of the effective longitudinal length of the pantograph means and the spacing of the positioning members longitudinally of the carrier conveyors, and driven case moving means on the frame lower portion for engaging and moving cases longitudinally of the frame under a portion of the fixed course of the carrier conveyors.

ARTICLE CONVEYING APPARATUS BROADLY

The apparatus of the invention is indicated as a whole by the numeral 10 and this apparatus is particularly designed for article deposit in and/or removal from carrier cases. The articles handled in the apparatus normally comprise bottles, and the article deposit or removal action is obtained when the cases are being moved through a fixed path. Likewise, the articles deposited in or removed from the cases move through a fixed path in correlation with the fixed path of the cases.

It will be realized that the apparatus of the invention usually is the same on its opposite lateral margins and only one lateral portion of the apparatus has been primarily shown and described in the accompanying specification and drawings.

Particularly, the apparatus 10 includes a suitable frame means including an upper portion 12 and a lower portion 14. The lower frame 14 has a conventional drive means 16 provided thereon which engages a case moving means or conveyor 18 suitably operatively positioned on the lower frame 14 and which is adapted to move cases 20 along a fixed path by a suitable sliding or other drive action. This drive means 16 connects to the case moving conveyor 18 in any suitable manner. The drive means 16 also includes a suitable drive shaft 22 that extends vertically of the apparatus for conveying drive to members on the upper frame 12 and with a unitary drive system being provided whereby members on the upper frame and lower frame are moved in timed and correlated relationship with each other for the desired article processing actions. The specific means mounted on the upper frame include at least a pair of endless carrier conveyors 24 and 26 that are operatively positioned on the upper frame as described hereinafter with these conveyors being in adjacent parallel relationship for movement through a fixed course extending longitudinally of the frame. The conveyors 24 and 26 are positioned in desired relationship above the case moving conveyor and have at least a portion of the orbit of these endless conveyors positioned above and adjacent the upper course of the case moving conveyor 18. A plurality of positioning members or bars 28 extend transversely of the upper frame 12 and are operatively secured at their ends to the carrier conveyors in the manners described hereinafter in more detail.

For article engaging and/or deposit action, any known type of article gripper means 30 are operatively secured to and are carried by the positioning members or bars 28 and depend therefrom for article engagement and/or transport action.

Figure 2:
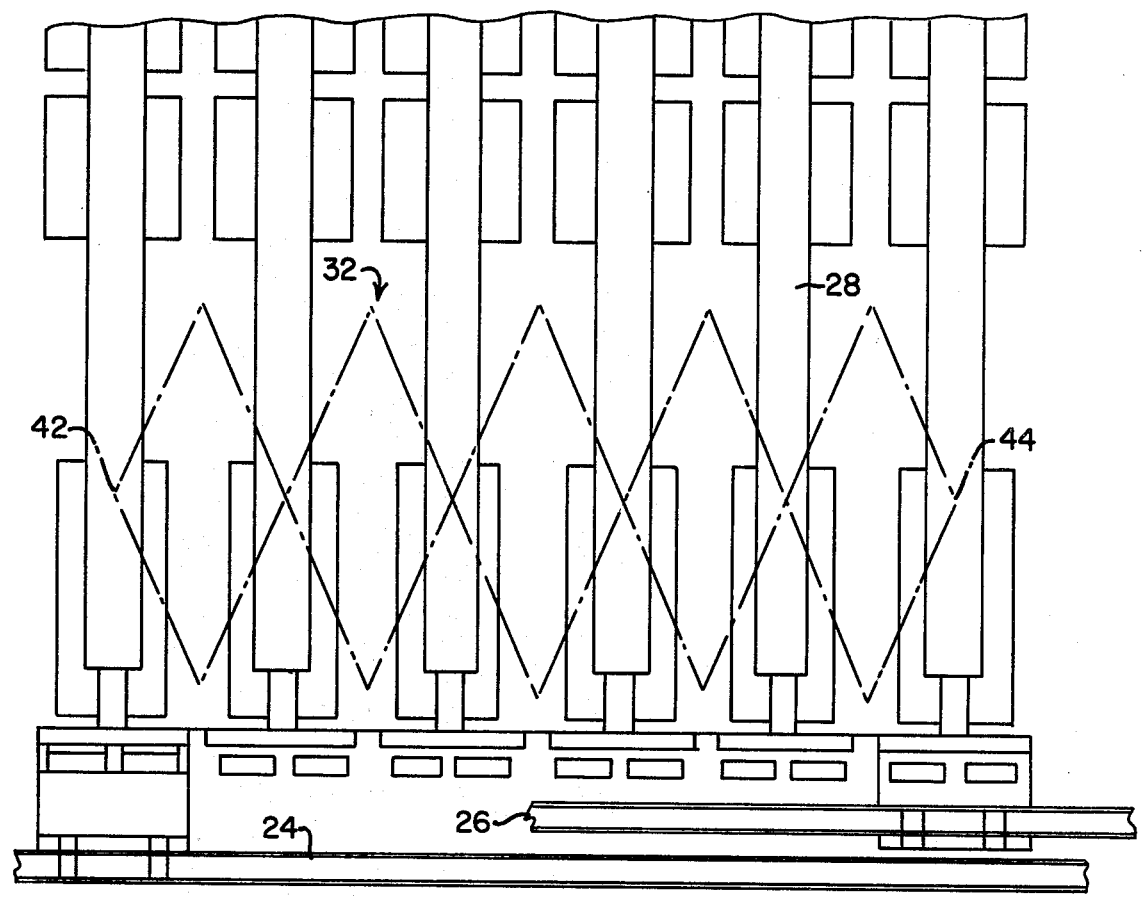
FIG. 2 is a fragmentary, partially diagrammatic, plan view of a portion of a pantograph assembly used in positioning article gripper carrier bars in the apparatus.
Figure 3:
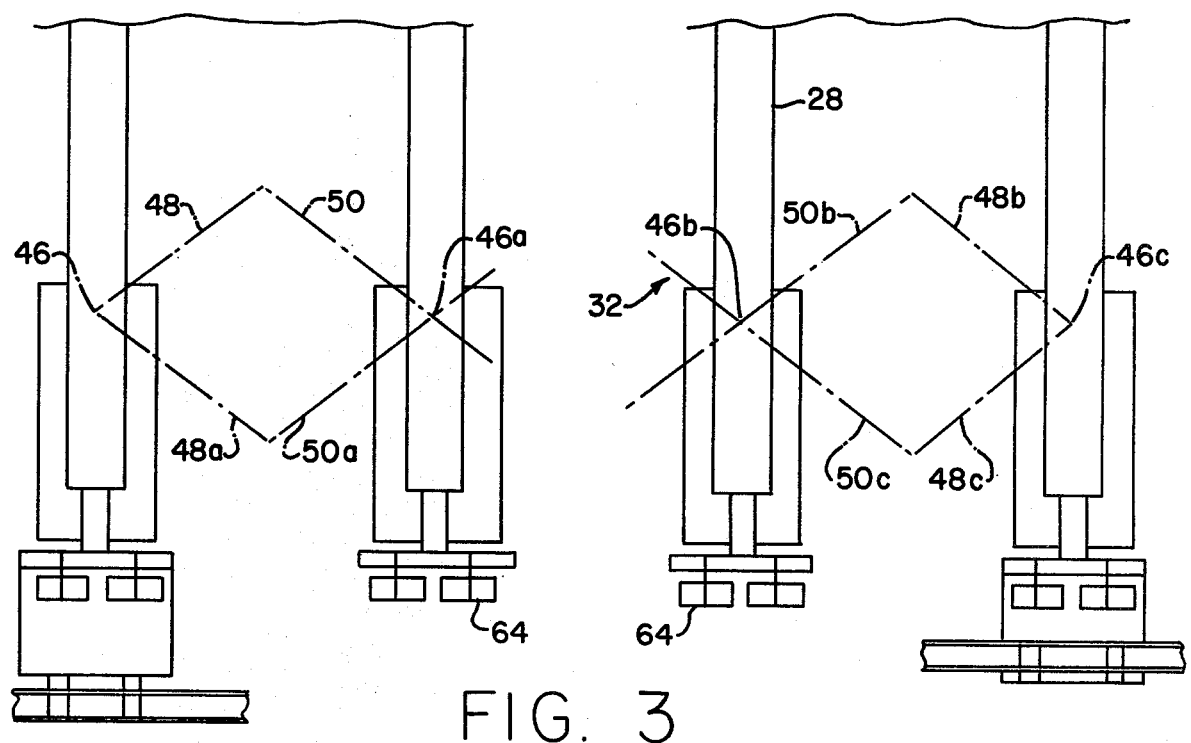
FIG. 3 is a broken away diagrammatic view of the pantograph apparatus of FIG. 2, but shown in a different operative position.

An important feature of the invention resides in a pantograph means indicated as a whole at 32 in FIGS. 2 and 3 of the drawings, and this pantograph means extends longitudinally of the frame and has a leading and a trailing end with different ends being secured to different ones of the conveyors 24 and 26. The pantograph means operatively connect the positioning members or mounting bars 28 to the carrier conveyors and control the longitudinal spacing of these bars along the length of the carrier conveyors to form a group of such carrier bars corresponding to the number of transverse rows of articles in a case being processed. The pantograph means forms the gripper jaw carrier bars 28 into sets corresponding to the size of the case being processed, and it enables the gripper jaws to be positioned to correspond exactly to the bottle grouping or array of the particular case being processed.

The drive shaft 22 operatively engages and drives the carrier conveyors in a manner as hereinafter explained, and control means, FIG. 5, and indicated at 34, form a part of the drive means for the upper portion of the apparatus. The control means 34 is effective in controlling the relationship of one conveyor to the other to change the effective longitudinal length of the pantograph means 32 and hence the spacing of the positioning members 28 longitudinally of the carriers. By the unitary drive means, correlated movement of the gripper means 30 along an upper portion of the apparatus in relation to movement of the cases 18 by the case moving conveyor on the lower portion or frame of the apparatus, is provided.

The apparatus has mechanically adjustable and controllable means primarily comprising the two carrier conveyors 24 and 26 and the pantograph means 32 provided for readily and accurately controlling the longitudinal spacing relationship of the gripper means positioning members or bars 28 in the apparatus. The location of the gripper means 30 on the transversely extending bars 28 to engage articles in different prearranged groups for article deposit or removal in relation to the cases 20 is regulated by other means described hereinafter.

PANTOGRAPH DETAILS

Figure 4:
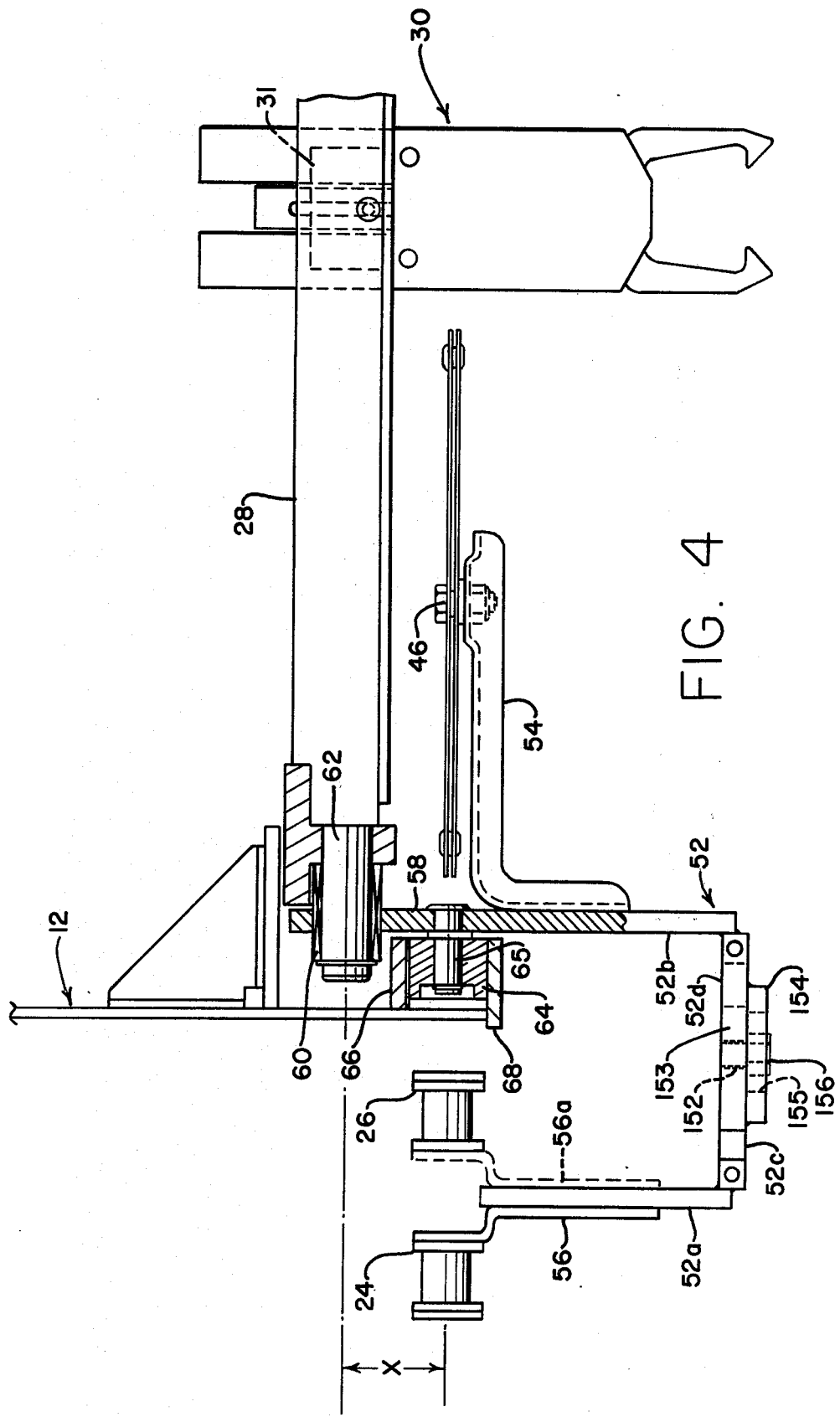
FIG. 4 is a fragmentary vertical section through a portion of one lateral margin of the apparatus of FIG. 1 and a gripper means assembly and carrier bar.

FIG. 1 indicates how the gripper means 30 are arranged in sets or groups at longitudinally spaced portions of the fixed orbit through which the carrier conveyors 24 and 26 move. The pantograph means 32 used for securing the transverse carrier bars 28 to the carrier conveyors is best shown in FIGS. 2, 3 and 4. Preferably the pantograph means comprises two individual pantograph devices 32 one of which is positioned adjacent each lateral margin of the upper frame 12, and two sets of two carrier conveyors with one set of conveyors 24 and 26 being positioned adjacent one lateral margin of the apparatus and with the other set of carrier conveyors (not shown) being positioned adjacent the opposite lateral margin of the apparatus. Considering the apparatus more accurately, the conveyors that cooperate with each other in mounting one of the individual transverse bars, for example, would comprise the conveyor 24 and its companion conveyor on the opposite side of the frame and then likewise the conveyor 26 cooperating with another similar conveyor on the opposite side of the apparatus for engaging individual transversely extending bars 28 to provide drive or control action at each end of these positioning members or bars. Each of these pantograph devices 32 has a leading end 42 and a trailing end 44. Each of the pantograph devices likewise comprises a plurality of fulcrum points or centers 46, 46a, 46b, 46c, etc. as indicated in FIG. 3 and each of these centers serves as a point for connecting the pantograph to the individual positioning members or bars 28. The pantograph includes short end links 48, 48a, 48b and 48c that pivotally connect to the leading fulcrum 46 and the trailing fulcrum 46c, as indicated in the drawings, and with full length pantograph links 50, 50a, 50b, 50c, etc. completing the pantograph by being pivotally secured at opposite ends thereof to either ends of the end links 48, 48a, or to another one of the connecting links 50, 50c, etc. to form the usual pantograph structure. These pantograph devices and the connecting sections or arms thereof must be flexible and will be described in more detail hereinafter.

The fulcrum points of the pantograph devices connect to control means or positioning members for the pantograph and thus the fulcrum 46, FIG. 4, connects to a substantially U-shaped bracket 52 by a connector bracket or ell 54 that has the fulcrum means or pivot 46 secured thereto. Such fulcrum means comprises a conventional member such as a hollow rivet connecting through two links and separating and cover washers. A center bolt also is used for the pivotal connection means. The U-shaped bracket 52 extends laterally outwardly of the apparatus and carries a connector bar 56 secured to the bracket and in turn is operatively secured to the outer carrier conveyor 24 for movement therewith. The opposite end of the pantograph device 40 has a similar U-shaped bracket and connector bar provided thereon but with the connector bar 56a, indicated in FIG. 4, being secured to an opposite face or portion of the bracket 52 and extending over and being secured to the inner carrier conveyor 26.

The end fulcrums and the remaining fulcrums of the pantograph 46a, 46b, etc. are all secured individually to one of the transverse bars 28 by brackets 54 engaging a plate 58 that may be a part of the brackets 52 for the end pantograph fulcrums. This plate 58 extends vertically of the apparatus and it positions a suitable bearing 60 at its upper end which bearing or bushing 60 rotatably receives a stub shaft 62 therein. Such stub shaft 62 normally is telescoped into engagement with an end of the transverse or carrier bar 28 to support the same in a rotatable manner on and extending between a pair of these plates 58.

The bracket 52 is made adjustable in both horizontal (lateral) and vertical directions by forming it in two end sections 52a and 52b that are adjustably secured together by horizontally directed metal plates 52c and 52d, respectively, each pivotally secured to the ends of the sections 52a and 52b, respectively. The plate 52c has a solid center end section that has a tapped aperture 152 therein. Plate 52d includes a pair of side bars 153 one being adjacent and extending along each side of the plate 52c. These bars 153 are connected by a bottom plate 154 (as shown in FIG. 4) that has a slot 155 extending in the transverse direction of from section 52a towards section 52b. A cap screw 156 extends through the slot 155 loosely and seats in the aperture 152 to retain the plates 52c and 52d in slidable assembly for bracket width adjustment.

The position of the transverse bar 28 and associated means, including the gripper means 30 depending therefrom is controlled by suitable members such as pairs of rollers 64 that are operatively positioned between and engage upper and lower flanges 66 and 68 suitable secured to a portion of the upper frame 12 and extend therearound in an endless course or orbit to parallel the course of movement of the carrier conveyors 24 and 26.

The rollers 64 are journalled on or secured to shafts 65 secured to spaced portions of the plates 58. It will be seen that the axis of the rollers 64, FIG. 4, is the same as the center line of rollers on the associated roller chains or carrier conveyors 24 and 26. Hence, the end fulcrums 46 and 46c are positioned by means of the full U-shaped brackets 52 but the intermediate fulcrums or pivot areas of the pantograph devices are individually supported on pairs of the rollers 64 operatively connected to each end of the transverse bars 28. By this engaging and controlling of opposite ends of the pantograph means or device 32 by the pairs of different conveyors 24 and 26, a change in the longitudinal relationship of corresponding links or portions of these chain conveyors in relation to the other will provide a corresponding change in the length or size of the pantograph device. This changes the article engaging pattern defined by the dependent gripper means and adjusts the apparatus for use with different cases and bottle arrangements within different sizes and types of cases. In all instances, all of the gripper carrier bars 28 are moved along the fixed course set up by the rollers 64 engaging the flanges 66 and 68.

CARRIER CONVEYOR DRIVE AND CONTROL SYSTEM

Figure 6:
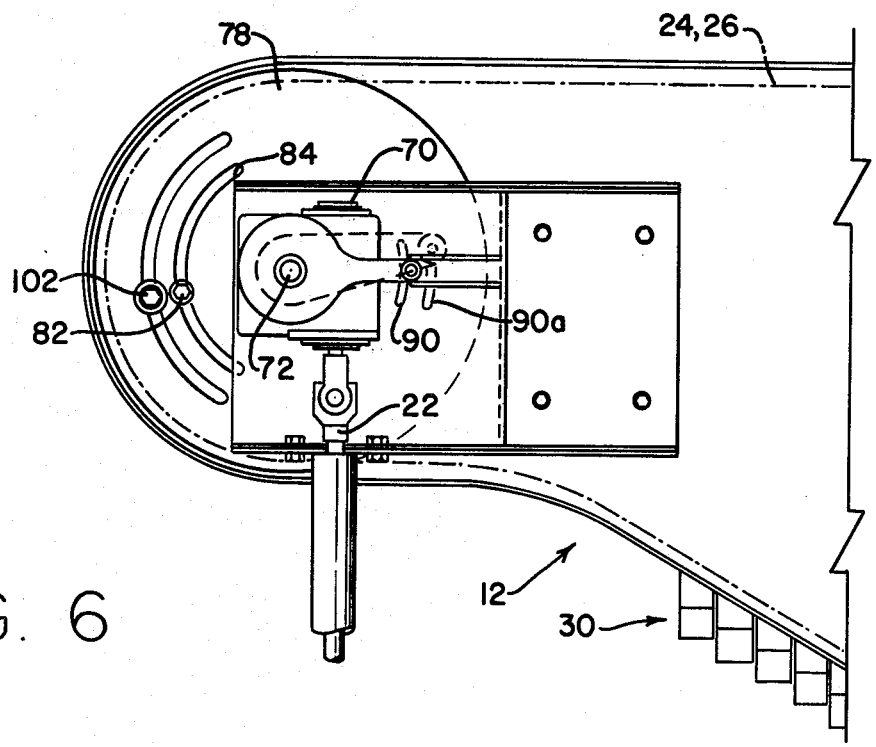
FIG. 6 is a fragmentary enlarged side elevation of the drive means of FIG. 5.
Figure 5:
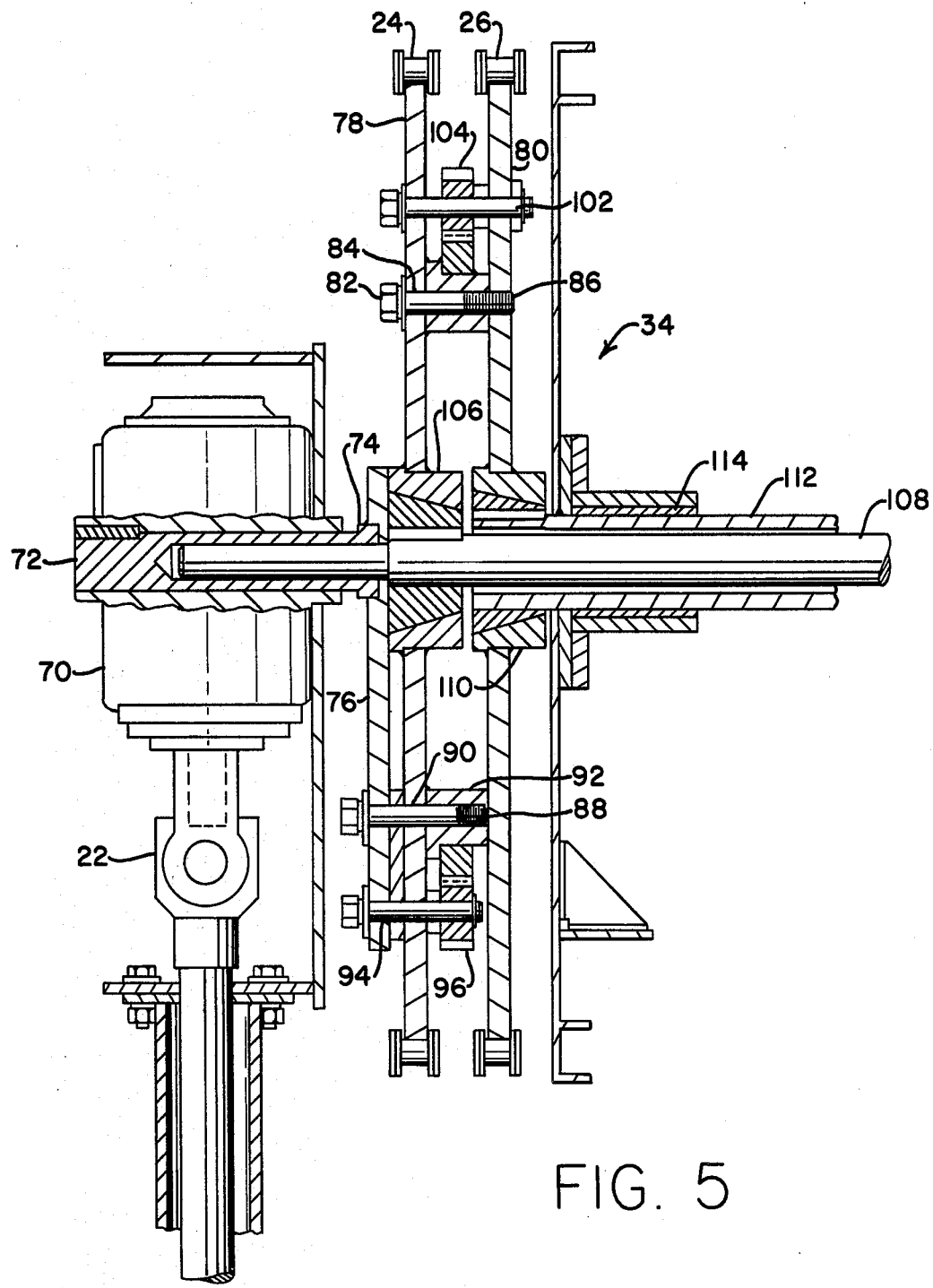
FIG. 5 is a fragmentary enlarged vertical section through part of the drive means of the upper control and drive conveyors and associated means in the apparatus.

FIGS. 5 and 6 best show details of this drive and control system for the carrier conveyors 24 and 26. The drive shaft 22 is shown connecting to a conventional gear box 70 that has a driven outlet sleeve 72 operatively connected thereto. Preferably a flange 74 is provided at one end of this sleeve 72 and a drive arm 76 is fixedly secured to the flange 74 and extends radially therefrom. The carrier conveyors 24 and 26 are mounted, respectively, on drive sprockets 78 and 80 that are positioned in adjacent parallel relation. These sprockets are formed into a unit by a member such as a cap screw 82 which extends through an elongate arcuate slot 84 in the sprocket 78 or a drive disc, as desired, and which engages with a tapped aperture 86 in the drive sprocket 80 whereby when the cap screw 82 is tightened, it draws the two sprockets together, in a manner hereinafter described in more detail, and forms a unit therefrom.

The actual drive arm 76 is secured to the drive sprocket or disc 78 by a cap screw 88 or equivalent that extends through an arcuate slot 90 of short circumferential length formed in the drive sprocket 78. The cap screw 88 engages a ring gear 92 having teeth on the radially outer periphery thereof and which is suitably welded or otherwise secured to the drive disc 78 on the laterally inner face thereof. The drive arm 76 also has a pinion shaft 94 rotatably carried therein and which mounts a pinion gear 96 on its laterally inner end and which gear 96 is in engagement with the ring gear 92. Hence, when this pinion shaft 94 is rotated, it will serve to move the unit formed from the drive sprockets 78 and 80 and conveyors 24 and 26 thereon with relation to the drive system. That is the pinion shaft 94 and pinion gear 96 cause movement of the drive disc 78, the ring gear 92 and the cap screw 88, which moves along in the slot 90, in relation to the drive shaft 22. Rotation of the shaft 94 also moves it along in the slot 90a. As sprockets 78 and 80 are secured into a unit by screw 84, the carrier conveyors 24 and 26 are moved or adjusted as a unit to change the upper frame drive system and carrier conveyors slightly in relation to the drive system on the lower frame portion. This provides an adjustment between the operative units or sets of the gripper means and transverse bars 28 in relation to the case moving conveyor 18 to adjust the apparatus for different cases and/or the spacing of receiving recesses in the cases from the ends of the cases.

A second and more important adjustment is provided in the relative positioning of corresponding portions of the carrier conveyors 24 and 26 by a second pinion shaft 102 rotatably engaging and carried by the laterally inner drive disc or plate 80 and carrying a pinion gear 104. Such gear also engages the ring gear 92 and this effectively rotates such sprocket or disc 78 circumferentially in relation to the disc 80 as the pinion shaft 102 can be rotated to move along the arcuate slot 90 in the sprocket 78 when the cap screw 82 is loosened. Such cap screw 82 when tightened will retain the sprockets or discs 78 and 80 in good frictional contact by means of the ring gear 92 received therebetween.

FIGS. 5 and 6 of the drawings also show that the sprocket 78 is suitably secured to a hub 106 operatively carried by a support shaft 108. The shaft 108 extends transversely of the apparatus and is rotatably received within the outlet sleeve 72 and positioned thereby.

The drive sprocket or disc 80 in turn engages a hub member 110 that is operably secured to and carried by a tubular shaft 112 and extends transversely of the apparatus and is journalled in any desired manner as by engaging a bushing 114 operatively carried by a portion of the upper frame 12.

FIG. 4 of the drawings shows that the individual gripper means 30 may be adjustably transversely positioned on the transverse bars 28 by members such as rollers or slides 31 and this facilitates lateral adjustment of the same all as described in more detail in a separate application directed to this particular structure. These gripper means can be moved laterally by known controls, and the movable gripper jaws, FIG. 4, are open and spaced from each other in the direction of movement of such gripper means through the fixed course of the conveyors 24, 26.

Figure 7:
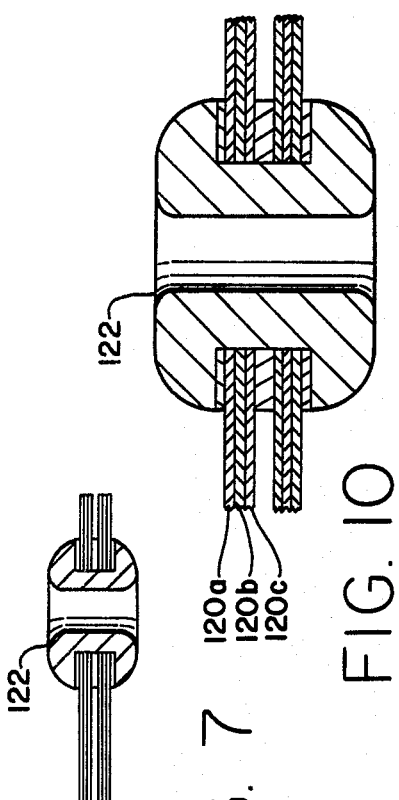
FIG. 7 is a fragmentary enlarged view of a portion of the pantograph means of the apparatus.
Figure 10:
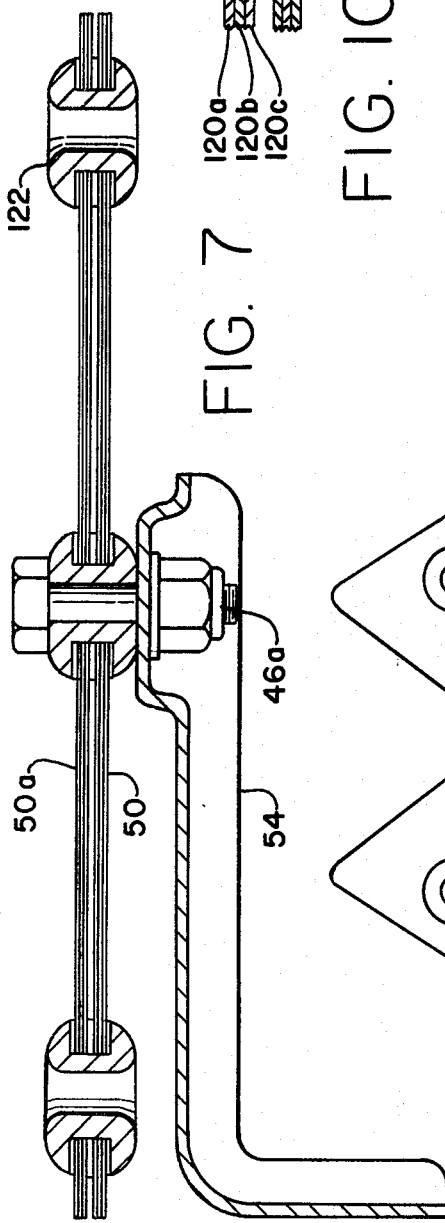
FIG. 10 is a fragmentary enlarged vertical section of a fulcrum connection of the pantograph.
Figure 8:
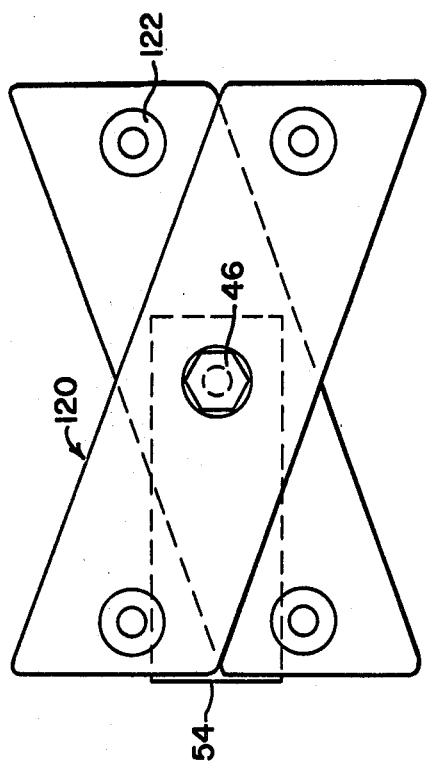
FIGS. 8 and 9 are partially diagrammatic plan views of a portion of the pantograph means of FIG. 7 showing them in different relative or extended positions.
Figure 9:
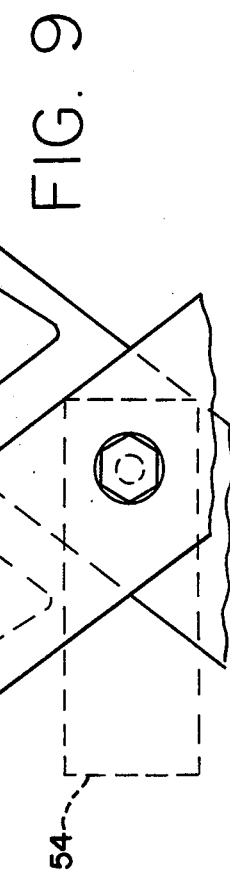

FIGS. 7, 8 and 9 show that the individual pantograph links preferably are formed from a plurality of relatively thin metallic, flexible metal straps or plates. FIG. 10 illustrates three plates 120, 120a and 120b that are positioned in superimposed relationship to form one of the individual links in the pantograph device. These individual links may be either of the full, or short link length, as required in making up the pantograph unit. Preferably the outer ends of these links are operatively and pivotally secured together as by hollow studs or rivets 122 having flared or enlarged ends in head portions thereon to secure the layers of the two links together but to permit pivotal movement between adjacent or connecting links of the pantograph for the usual expanding and contracting actions of the pantograph. Any suitable washers can be used in pivotally securing these links together, and the pantograph fulcrums likewise permit the required pivotal engagement of the pantograph links. The pantograph units are provided in any suitable longitudinal spacing along the conveyors 24, 26.

By making the pantograph links from a plurality of, usually three, thin, such as 0.028 inch spring metal strips of some appreciable width such as about 1½ to 2½ inch or more, the links have sufficient strength in the direction of the longitudinal axes of the strips when the strips are either in the unstressed flat or in the curved shape of a portion of the upper conveyors course to expand or contract the pantograph means. This will accurately control the longitudinal spacing and locations of the gripper jaws depending from the mounting bars 28.

FIG. 1, being partly diagrammatic, does not necessarily show an accurate position relationship between sets of the gripper jaws 30 longitudinally of their carrier conveyors 24,24, 26,26 and the case pusher means on the conveyor 18. Naturally the orbit of the gripper jaws is set up to bring them into engagement with the bottles in the cases 20 as moved through a fixed course by the conveyor 18 and associated support means.

From the foregoing, it will be seen that the entire apparatus of the invention has one drive means therefor and that correlation is obtained between the case drive and control movement through the apparatus in relation to movement of the article gripper means provided in the apparatus. By use of the pairs of carrier conveyors and by use of the pantograph means engaging the gripper means positioning bars 28 and attaching them to the carrier conveyors, a mechanical adjustment action of a novel and unique nature has been provided to regulate the longitudinal spacing of the transverse bars 28 to accommodate the apparatus for use with cases having different numbers of, and longitudinal spacing of, rows of articles therein. The lateral positions of the individual gripper means on a positioning bar may be controlled in any suitable manner. The apparatus of the invention is positive in action and can be easily controlled and adjusted, but yet the apparatus will provide a long service life and will function rapidly, automatically and efficiently for bottles to be deposited into or withdrawn from cases as desired.

Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. In apparatus for article deposit and/or removal from carrier case, the combination comprising a plurality of positioning members for mounting article grippers thereon, a pantograph means including leading and trailing ends and at least one fulcrum pivot intermediate said ends, a pair of endless carrier means with each one of said carrier means engaging a different end of said pantograph means, said carrier means being movable through a fixed course, drive means operatively engaging said pair of endless carrier means to move them through fixed courses, and adjustable means connecting said pair of carrier means to said drive means to provide adjustment of the individual ones of said carrier means in relation to each other to vary the size of said pantograph means, individual ones of said positioning members being secured to the ends and fulcrum pivot of said pantograph means to be moved therewith.

2. Apparatus as in claim 1, where said carrier means comprises two pairs of carrier conveyors that are present on side area of said frame upper portion, means securing the ends of said pantograph means to different ones of said pairs of carrier conveyors, and roller means on said positioning members operatively engage members on said frame upper portion to aid in locating said positioning members for movement through a fixed course.

3. Apparatus as in claim 1, where said pantograph means comprises a plurality of arms or links pivotally connected for pantograph action, and each of said arms is made from a plurality of normally flat spring metal strips that are flexible out of a usual planar shape.

4. Apparatus as in claim 1, where said pantograph means comprises a plurality of elongated arms pivotally connected for pantograph action, and each of said arms is normally flat and will transmit forces longitudinally thereof but is flexible out of its normal plane.

5. Apparatus as in claim 1, where two pairs of said carrier means are present in transversely spaced relation on said frame upper portion, and means secure the ends of the leading and the trailing ones of said positioning members to corresponding ones of said two pairs of carrier means for movement through an endless fixed course.

6. Apparatus as in claim 1, where said carrier means include conveyors mounted on sprocket means including a pair of adjacent, parallel sprockets, and said adjustable means include a device securing said sprockets together for unitary drive thereof, and one of said conveyor sprockets has an arcuate slot therein through which said device extends, and a ring and pinion gear means connected between said sprockets for arcuate adjustment movement of one of said sprockets in relation to the other, when said device is loosened.

7. Apparatus for article deposit and/or removal from carrier cases and comprising
a mounting frame including upper and lower portions,
a pair of endless carrier conveyors operatively positioned on said frame upper portion in adjacent parallel relation for movement on a fixed course extending longitudinally of said frame,
a plurality of positioning members extending transversely of said frame and operatively connected to said carrier conveyors for movement therewith,
article gripper means positioned on and depending from said positioning members,
a pantograph means extending longitudinally of said frame and having a leading and a trailing end with different ends being secured to different ones of said conveyors, said pantograph means operatively connecting said positioning members to said carrier conveyors,
drive means connecting to said conveyors to drive the same,
control means forming a part of said drive means connection to control the relationship of one conveyor to the other conveyor to change the effective longitudinal length of said pantograph means and the spacing of said positioning members, and
case moving means on said frame lower portion to move cases longitudinally of said frame under a portion of the fixed course of said carrier conveyors.

8. Apparatus as in claim 7, including a common drive means for said case moving means and for said carrier conveyors, said pair of carrier conveyors being secured together for unitary movement, and means for adjusting the relative positions of said pair of carrier conveyors longitudinally of the apparatus in relation to said case moving means.

9. Apparatus as in claim 7, where two pairs of said carrier conveyors are present in transversely spaced relation on said frame upper portion, and means secure opposite ends of the leading and the trailing ones of said positioning members to corresponding ones of said two pairs of carrier conveyors for drive by carrier conveyors engaging each end of said positioning members.

10. Apparatus as in claim 7, including roller means operatively carried on end portions of said positioning members, and endless cam plates operatively positioned on said frame upper portion to engage said roller means and position said article gripper means for movement through a fixed course.

11. Apparatus as in claim 7, where said pantograph means comprises a plurality of elongated arms pivotally connected for pantograph action, and each of said arms is normally flat and will transmit forces longitudinally thereof but is flexible out of its normal plane.

12. Apparatus as in claim 7, where said carrier conveyors are mounted on sprocket means including a pair of adjacent parallel sprockets and said control and drive means include a device securing said sprockets together for unitary drive thereof, and one of said conveyor sprockets has an arcuate slot therein through which said device extends and, when loosened, permits arcuate adjustment movement of one of said sprockets in relation to the other.

13. Apparatus as in claim 12, where said control and drive means further includes a ring and pinion gear means connecting between said sprockets to provide arcuate adjustment of one sprocket in relation to the other sprocket.

14. In apparatus for removing containers from cases, including means to move a case along a predetermined path, said case having columns of containers aligned in the direction of case movement, and an endless conveyor loop above said path carrying means vertically suspended below the loop along a lower reach to successively engage containers of each column and lift the containers from the case while the case is moved along the path, the improvement wherein a pair of driven endless carrier conveyors are operatively positioned in adjacent parallel relation to form said conveyor loop for movement on a fixed course extending longitudinally of the apparatus,
a plurality of positioning or mounting bars extend transversely of the apparatus and have said article gripper means dependent therefrom, and
a pantograph means extending longitudinally of the apparatus having a leading and a trailing end with different ends being secured to different ones of said conveyors for movement therewith, said pantograph means operatively connecting said positioning bars to said carrier conveyors.

15. Apparatus as in claim 14 including control means forming a part of a drive means for said conveyors to control the relationship of one conveyor to the other conveyor to change the effective longitudinal length of said pantograph means and the longitudinal spacing of said positioning bars.

16. Apparatus as in claim 15, where two pairs of said carrier conveyors are present in transversely spaced relation on the apparatus, and opposite ends of the leading and the trailing ones of said mounting bars are secured to corresponding ones of said two pairs of carrier conveyors, and roller means on said mounting bars operatively engage control members to aid in locating said mounting bars for movement through a fixed course.

* * * * *